May 17, 1949.  W. T. ROSSELL  2,470,649
ARMREST AND STANCHION
Filed Jan. 22, 1945

Inventor
William T. Rossell,
By Windsor Davis
Attorney

Patented May 17, 1949

2,470,649

UNITED STATES PATENT OFFICE 2,470,649

ARMREST AND STANCHION

William T. Rossell, New York, N. Y., assignor to Transit Research Corporation, New York, N. Y., a corporation of New York Application January 22, 1945, Serial No. 573,831

6 Claims. (Cl. 155—16)

This invention relates to stanchions such as may be grasped by a passenger on a public vehicle and has for its object to provide a stanchion of improved safety and utility which will be of service to steady a standing passenger and which will serve as a rest for a seated passenger.

Another object is to provide a stanchion which will extend from the ceiling of the vehicle downwardly to the height of an arm rest and which will then follow a curve to form an arm rest of comfortable shape which will act to cradle a seated passenger who is somewhat crowded thereagainst.

Another object is to provide a combination stanchion and arm rest which will be attached to the ceiling of the vehicle and to the back of a seat and which may also, in one form, have a brace connecting the arm rest with the seat for added strength.

A further object is to provide a combination stanchion and arm rest, the arm rest being so formed that a passenger seated adjacent thereto may swing his legs thereunder to permit passage of another passenger on the same seat without arising.

A still further object is to provide an arm rest without dangerous corners and protected by its stanchion portion to prevent injury of a passenger who may be thrown thereagainst by the motions of the car or for any other reason.

Another object is to provide a combination stanchion and arm rest which can be readily and economically manufactured, which will be attractive in appearance and which will add generally to the comfort and convenience of the riding public.

Figure 1:
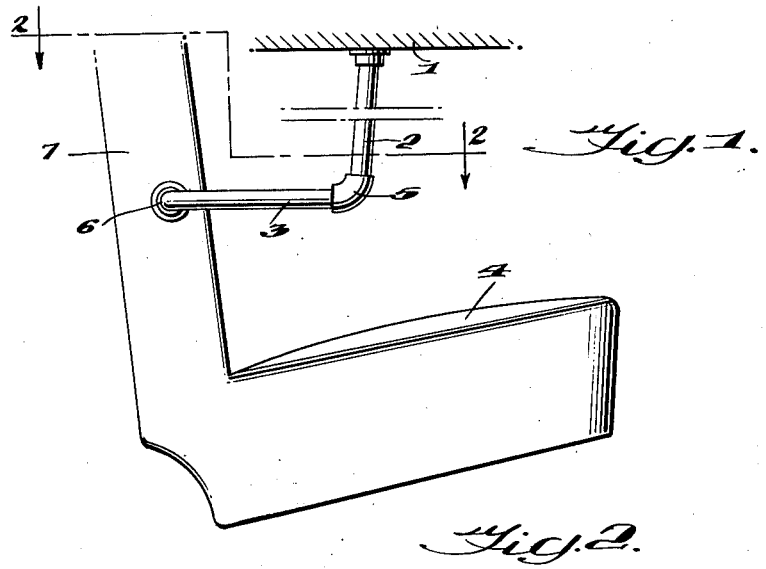
Figure 2:
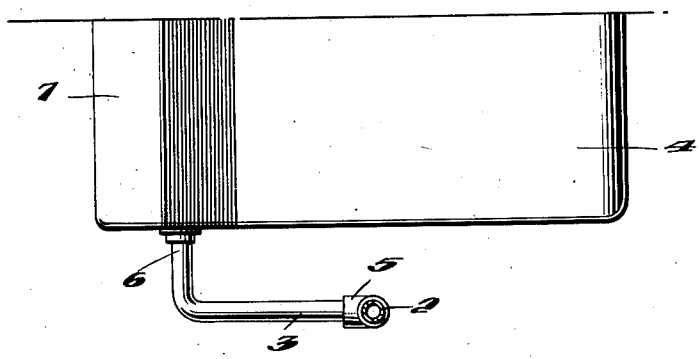
Figure 3:
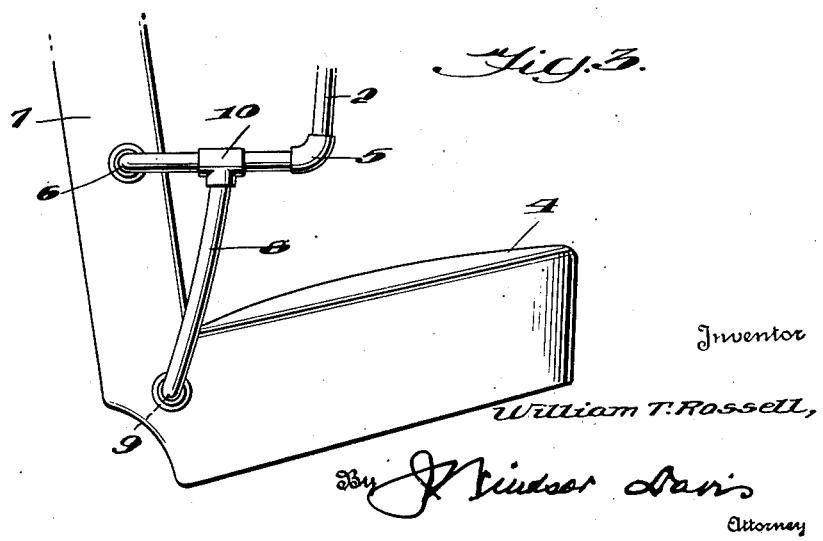

Other objects and advantages will become hereinafter more fully apparent as reference is had to the accompanying drawings in which my invention is illustrated and in which Figure 1 is an end elevation of a vehicle seat showing my improved stanchion and arm rest associated therewith, Figure 2 is a horizontal section taken along the line 2—2 of Figure 1 showing the seat and arm rest in top elevation, and Figure 3 is a view similar to Figure 1 showing a modification of my invention.

More particularly, 1 indicates the roof or ceiling of a vehicle, such as a street car or bus, from which depends my improved stanchion composed of a vertical tube-like portion 2 which is bent substantially horizontally as it approaches the seat 4 in order to form an arm rest 3 therefor. Since it is difficult to obtain a bend sufficiently sharp at this point it will be found more satisfactory to join the arm rest and the vertical portion by a fitting 5. The arm rest 3 is then bent on a substantially horizontal arc 6 and attached at its end to the back 7 of the seat 4. The vertical portion 1 is substantially opposite the longitudinal midsection of the seat 4. This vertical portion thus serves as a hand grip for standee passengers and as a protection against the possible injury of the lower part of the spine of a passenger by the arm rest. The arm rest is so spaced above the seat as to permit a passenger occupying the seat to swing his legs thereunder, without arising, so that another passenger may pass. The arm rest is curved at 5 in order to cradle a passenger above his hip bone. Thus, two fat people may occupy the seat 4 with greater comfort.

In Figure 3 the construction of the stanchion 2 and arm rest 3, 5 is the same as in Figure 1, a brace being added for additional strength. The brace is composed of a tubular member 8 which is anchored, preferably, at 9 to the lower portion of the seat back 7. A fitting 10 is inserted in the length of the arm rest 3 and the top of the brace 8 is secured thereto. The shape and placement of the brace 8 is such that it leaves the space beneath the arm rest substantially free and such that no sharp corners or irregularities are presented against which a passenger might become injured.

Various modifications may be made within the scope of my invention and I desire to be extended protection within the scope of the appended claims.

What I claim is:

1. The combination of a stanchion attached at its upper end to the ceiling of a vehicle and extending downwardly substantially vertically to the approximate height of an arm rest of a passenger seat, an arm rest for the passenger seat fixedly secured adjacent one end to the lower end of said stanchion and fixedly secured at its other end to the back of said seat.

2. The combination of a vehicle seat, a stanchion secured to and extending from the ceiling of the vehicle downwardly to a point alongside the end of said seat and terminating substantially above said seat, and an arm rest secured to and extending from the back of said seat substantially horizontally and fixedly secured to the bottom of said stanchion, said arm rest and said stanchion by their construction leaving a clear space immediately opposite and above the end of said seat.

3. The combination of a stanchion secured to and extending downwardly from the ceiling of a vehicle toward a point alongside and intermediate the depth of a seat, an arm rest connected to the back of said seat and extending substantially horizontally alongside and above said seat, said arm rest being fixedly secured to the bottom of said stanchion thereby leaving the front half of said seat and the space beneath said arm rest and stanchion unobstructed.

4. The combination of a stanchion secured to and extending downwardly from the ceiling of a vehicle toward a point alongside and intermediate the depth of a seat, an arm rest connected to the back of said seat and extending substantially horizontally alongside and above said seat, said arm rest being secured to the bottom of said stanchion thereby leaving the front half of said seat and the space beneath said arm rest and stanchion unobstructed, said arm rest being horizontally curved on an arc of substantial radius as it approaches the back of said seat whereby a passenger in said seat may be partially cradled thereby.

5. In a vehicle equipped with seats, the combination of a stanchion and an arm rest, said stanchion being secured to the ceiling of the vehicle and terminating adjacent a seat at its lower end at the height of an arm rest, an arm rest fixedly secured to the bottom of said stanchion at one end and secured to the back of the vehicle seat at its other end, said arm rest being horizontally curved towards its end adjacent the back of said seat whereby a passenger may be partially cradled thereagainst outwardly of said seat.

6. The combination of a stanchion attached to and extending downwardly from the ceiling of a vehicle toward a point alongside and intermediate the depth of a seat, an arm rest connected to the back of said seat and extending substantially horizontally alongside and above said seat, said arm rest being secured to the bottom of said stanchion thereby leaving the front half of said seat and the space beneath said arm rest and stanchion unobstructed, and a brace member connecting said arm rest to the lower portion of said seat, said brace member being attached to said arm rest intermediate the length of said arm rest whereby to substantially preserve the unobstructed space beneath said arm rest.

WILLIAM T. ROSSELL.

REFERENCES CITED

The following references are of record in the file of this patent:

UNITED STATES PATENTS

| Number | Name | Date |
|---|---|---|
| 21,436 | Myers et al. | Sept. 7, 1858 |
| 870,386 | Robbins | Nov. 5, 1907 |
| 992,164 | Christianson | May 16, 1911 |
| 2,139,852 | Rossell | Dec. 13, 1938 |